Dec. 25, 1962 R. A. LEIGHTNER 3,070,713
THREE STABLE STATE COUNT DOWN DEVICE
Filed Nov. 16, 1959
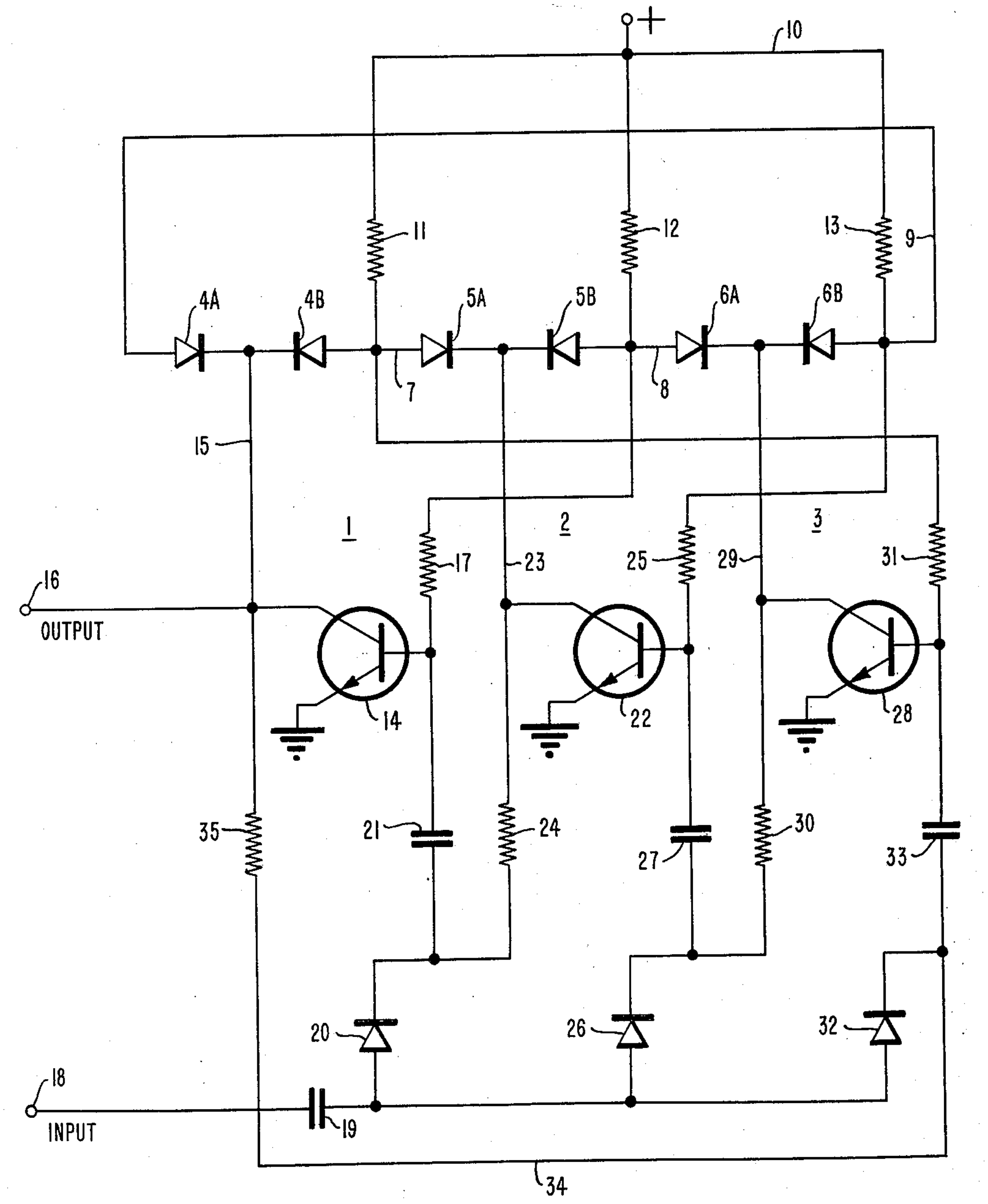
INVENTOR
ROBERT A. LEIGHTNER
BY Stevens, Davis, Miller & Mosher
ATTORNEYS United States Patent Office 3,070,713
Patented Dec. 25, 1962

3,070,713
THREE STABLE STATE COUNT DOWN DEVICE

Robert A. Leightner, Tioga Center, N.Y., assignor to International Business Machines Corporation, New York, N.Y., a corporation of New York
Filed Nov. 16, 1959, Ser. No. 853,183
4 Claims. (Cl. 307—88.5)

This invention relates generally to pulse counter systems, and more particularly to the type of counter circuitry which utilizes a plurality of cascaded transistor amplifier stages.

In modern day electronic systems, it is often necessary to produce an output signal at a frequency which bears a predetermined or fixed relationship to the repetition rate of the pulses supplied to the input terminals of the particular system. The frequency of the output signal thus produced most commonly takes the form of a sub-multiple or quotient of the frequency of the input pulses.

Where frequency reduction by powers of 2 is required, as in conventional binary counter systems, very efficient frequency division is accomplished by using conventional bistable multivibrators of either vacuum-tube or transistorized design. Such bistable multivibrator circuits are also referred to as flip-flop circuits by those skilled in the art. To obtain multiple division, it is possible to employ a plurality of cascaded stages, each comprising a bistable circuit which shifts between "on" and "off" conditions upon receipt of two successive input pulses. One output pulse is produced by each such stage every time a cycle from "off" through "on" and back to "off" is completed. Such counters produce a single output pulse whenever a number of pulses equal to some power of 2 is supplied to the input terminals of the circuit. The particular power of 2, of course, depends upon the number of individual stages which are cascaded to form a complete circuit. Thus, where a single bistable multivibrator or flip-flop is used as a count down or frequency divider circuit, an output frequency of one-half the input frequency is produced. Where two cascaded flip-flops are employed, the output frequency equals one-fourth the value of the input frequency.

In present day pulse counting systems, it is often necessary to accomplish frequency division in powers other than 2. For this purpose, known types of flip-flop or bistable multivibrator circuits may be modified from strict binary operation to produce an output pulse upon receipt of a number of input pulses unrelated to successive powers of 2. For instance, in seeking to obtain a frequency division of one-third, or successive exponential powers of this value by means of cascaded stages, it is necessary to employ a pair of flip-flops with a pair of gating circuits in connection with each stage. This, of course, effects a resulting increase in the cost, space requirements, and complexity of each stage of the entire frequency divider system. Where weight and volume are vitally important considerations, such as in guided missiles or piloted airborne systems, the increased weight and packing space occasioned by the necessity for employing extra components represent a decided disadvantage. Moreover, the increase in circuit complexity and number of components which occurs as a result of adding the additional gating circuitry effects a statistical decrease in over-all reliability because of the greater number of components which are subject to failure or malfunction.

It will thus be appreciated that provision for frequency division in powers of one-third, without increase in the number of components and complexity, would inherently result in values for reliability, fabrication cost, and total weight which are superior to those available by modifying conventional binary counter circuits.

In prior art systems for accomplishing frequency division through successive powers of one-third by means of transistorized circuits, it has been necessary to utilize point contact transistors which are connected to operate as emitter followers, and the mode of operation of the circuit has required A.-C. coupling between the cascaded amplifier stages.

According to the present invention, there is provided a simple and easily constructed count down circuit in which the additional components and expense required to modify conventional flip-flops for frequency division in powers of one-third are entirely eliminated. By this means, a highly significant increase in reliability is accomplished along with a marked reduction in weight and volume requirements. Additionally, by utilizing junction transistors in a common emitter configuration with D.-C. interstage coupling to form a counter with perfect ring symmetry, the disadvantages which inherently accompany the use of point contact transistors in a frequency divider circuit are avoided. According to the invention, the completed frequency divider system utilizes a number of stabilized pulse amplifier stages. Three such stages are coupled to each other to provide ring symmetry in such a fashion that the first input pulse acts to turn on the first transistor, the second input pulse acts to turn on the second transistor, and the third input pulse operates to turn on the third transistor. During the conduction period of any one of the transistors, the remaining two transistors are maintained non-conductive.

Moreover, by employing an ingenious diode ring which utilizes a number of pairs of oppositely poled diode-rectifiers connected in series circuit relationship, a voltage drop is maintained across two of the collector load resistances at all times, even though only one transistor in one of the stabilized pulse amplifiers is conducting during a particular interval of time.

Accordingly, therefore, a primary object of the present invention is to disclose circuitry and components for an ingenious frequency divider which employs a plurality of stabilized pulse amplifiers connected in cascade to provide ring symmetry.

Another object of the present invention is to provide a count down circuit which is capable of deriving an output frequency which assumes a value of one-third of the input frequency and which is characterized by increased reliability with diminished weight, volume and cost.

Still another object of the present invention is to provide a transistorized frequency divider system which employs junction transistors and D.-C. interstage coupling to provide a simple and reliable circuit.

A further object of this invention is to provide a uncomplicated and trouble-free transistorized count down circuit for reducing the input frequency of the pulses in a given wave-train by powers of one-third.

These and other objects and advantages of the present invention will become apparent by referring to the accompanying detailed description and single FIGURE of drawings, which shows schematically the interconnections between the circuitry and components of the transistorized count down circuitry of the present invention.

Turning now to the detailed description of the invention, and more particularly to the drawing, the reference numerals 1, 2, and 3 have been used to identify three individual stabilized pulse amplifier stages connected in cascade to accomplish a frequency reduction of one-third. Directly above the amplifier stages three pairs of oppositely poled diode-rectifiers are illustrated. The diode-rectifiers thus shown are connected to form a closed loop in order to provide voltage drops across the selected collector resistances of any two non-conducting transistors when the remaining transistor is carrying current.

In the left-hand portion of the closed loop, the reference numerals 4A and 4B have been used to designate a first pair of oppositely poled diode-rectifiers connected to provide a common juncture therebetween. Directly to the right, a second pair of oppositely poled diode-rectifiers 5A and 5B are illustrated, and the latter mentioned rectifiers are similarly connected to form a common junction between corresponding elements. In the right-hand portion of the loop formed by the several pairs of diode-rectifiers, the numerals 6A and 6B have been used to identify a third pair of oppositely poled diode-rectifiers similarly connected to form a common junction.

In order to enhance the clarity of the present detailed description and claims, the triangular portion of the symbol used to indicate the diode-rectifiers will be referred to as the anode element. Conversely, the short line positioned to contact the apex of each such triangular portion will be referred to as the cathode element.

From the foregoing discussion of the circuitry, it will be appreciated that the diode-rectifier pairs 4A—4B, 5A—5B, and 6A—6B are connected to form three individual sets of common-cathode junctures. It will also be appreciated that the diode rectifiers 4B and 5A form a first common-anode juncture, that diode-rectifiers 5B and 6A form a second common-anode juncture, and that, finally, diode-rectifiers 6B and 4A form a third common-anode juncture.

In the drawings, the diode-rectifiers 4B and 5A are interconnected to form a common-anode juncture by means of a metallic conductor 7. In like manner, the diode-rectifiers 5B and 6A are conductively joined to form to common-anode juncture by means of a conductor 8. Lastly, the diode-rectifier 6B is connected to the diode rectifier 4A in the left-hand portion of the circuit by means of a conductor 9, in order to form a common-anode juncture and complete the closed loop. It will be noted that the diode-rectifier 6B and the diode-rectifier 4A are connected with opposite polarity in the same manner as the other diode-rectifiers in the loop.

The common-anode juncture between the diode-rectifiers 4B and 5A is connected to receive operating potential from a positive bus 10 shown immediately thereabout through a resistor 11. The common-anode juncture formed between the rectifiers 5B and 6A or the conductor 8 is tied to the positive bus 10 through a resistor 12. The common-anode juncture between the diode-rectifiers 6B and 4A is connected in like manner to the positive bus 10, via a resistor 13.

Continuing with the detailed description, and turning to the details of the stabilized pulse amplifier stage 1, reference will now be made to the conventional NPN transistor 14 shown in the center of this stage. The transistor 14 is provided with the usual base, collector and emitter electrodes. The emitter electrode of the transistor 14 is tied directly to ground, and the collector electrode is directly connected to the common-cathode juncture between the diodes 4A and 4B by means of a conductor 15. To the left of the transistor 14, the output terminal 16 for the complete system is connected to the collector electrode of the transistor to receive the reduced frequency potential which is developed at this electrode.

The base electrode of the transistor 14 is connected to the common-anode juncture between diode-rectifiers 5B and 6A by means of a resistor 17. The base electrode is also connected to receive signal energy from the input terminal 18 shown to the left of the diagram, by means of a coupling capacitor 19, a diode-rectifier 20, and a capacitor 21 connected in series.

Turning to the details of the transistorized pulse amplifier stage 2, it will be noted that the reference numeral 22 has been used within this stage to identify a conventional NPN type transistor provided with collector, base, and emitter electrodes. The emitter electrode is tied directly to ground, while the collector electrode of the transistor is conductively coupled to the common-cathode juncture between diode-rectifiers 5A and 5B by means of conductor 23. It will be noted that the collector electrode is also connected to the juncture between capacitor 21 and diode-rectifier 20 in the previous stage by means of a resistor 24.

The base electrode of transistor 22 is connected to one end of the resistor 13 at the common-anode juncture between rectifiers 6B and 4A by means of a resistor 25. This base electrode is also connected to receive input signals from the input terminal 18 by means of a diode-rectifier 26 and a capacitor 27 connected in series circuit relationship with the coupling capacitor 19.

Concluding the detailed description of the circuitry, and turning now to the remaining stage of stabilized pulse amplifier circuitry, it will be noted that the reference numeral 28 has been used to identify a conventional NPN type transistor provided with the usual base, collector, and emitter electrodes. The emitter electrode is grounded in the same manner as in the previously described transistor stages. The collector electrode, on the other hand, is connected to the common-cathode juncture between rectifiers 6A and 6B by means of conductor 29. The collector electrode is also tied to the juncture between the capacitor 27 and diode-rectifier 26 located in the previous stage by means of a resistor 30.

The base electrode of the NPN transistor 28 is conductively tied to the common-anode juncture between diode rectifiers 4B and 5A by means of a resistor 31. The base electrode of this transistor is also connected to receive input signals from the input terminal 18 through capacitor 33 and diode-rectifier 32 which are connected in series with the coupling capacitor C19 to receive energy from the input termnial 18. In addition, the junction between capacitor 33 and diode rectifier 32 is conductively interconnected to the collector electrode of the first transistor 14 by means of a conductor 34 and a resistor 35 connected in series.

With the circuit as just described, there is provided a three-state circuit in which the transistors 14, 22 and 28 are coupled to each other with ring symmetry in such a manner that the first incoming pulse turns on transistor 28, the next pulse renders transistor 22 conductive, and the third pulse renders the transistor 14 conductive. It will be noted that the resistors 11, 12, and 13 function as collector load resistors. During the conduction cycle of each transistor, the other two transistors are maintained in a quiescent or non-conductive condition. As earlier mentioned, the collector load resistors 11, 12 and 13 shown in association with the closed diode loop are each connected to feed two transistors through the diode ring which includes diode-rectifiers 4A and 4B, 5A and 5B and 6A and 6B. With this configuration, there is a voltage drop across two of the collector load resistances notwithstanding the fact that only a single transistor is carrying current.

At initiation it may be assumed that the transistor 14 begins conducting. The collector voltage on transistor 14 immediately drops to zero volts, which biases transistor 22 and 28 to cutoff through resistors 25 and 31, respectively. At this time, diode-rectifiers 20 and 26 are back-biased due to the positive voltage existent on the collector electrodes of transistors 22 and 28. Then, the first positive input pulse finds and opens a path through diode-rectifier 32 and capacitor 33 so as to turn on transistor 28 by forward biasing its base-emitter junction. With transistor 28 conducting, transistors 14 and 22 are biased off through resistors 17 and 25, respectively. The next input pulse turns on transistor 22 through diode-rectifier 26 and capacitor 27. The third pulse turns on transistor 14; and with the output line connected to the collector of transistor 14, an output pulse is then provided.

In this manner, one output pulse is obtained for every three input pulses. By cascading a plurality of the inventive count down circuits together, it is possible to reduce the input frequency by a factor of one-third raised to an exponential power related to the number of stages employed. Since the circuit shows perfect ring symmetry, with all the transistors connected in identical circuits, the explanation of the change of state provided immediately above applies with equal force to all of the stages of amplification.

In practicing the invention, it should be appreciated that the values of the capacitors 21, 27 and 33 used in the stabilized amplifiers are dependent upon the operating speed required of the circuit, the rise time of the input pulse, and the amount of noise present in the input circuitry. The value of the coupling capacitor 19 is, of course, dependent upon the same factors. In operation, values from 100 to 10,000 microfarads yield excellent results.

In order to prevent saturation of the transistors, an additional pair of oppositely poled diode-rectifiers may be used in conjunction with each of the transistors 14, 22 and 28. For instance, with the transistor 14, a diode-rectifier may be connected with its anode element tied directly to the collector electrode. The cathode element is tied to the end of resistor 17 closest the base electrode.

In order to accomplish optimum temperature stabilization, the emitter electrodes of transistors 14, 22, and 28 may be commonly connected to ground through a parallel-connected resistor and capacitor of appropriate value, and the base electrodes of each of the individual transistors may be similarly tied to ground through separate resistances.

Where it is desired to enhance the high frequency operating characteristics of the basic circuitry, a marked improvement may be effected by the use of four additional diode-rectifiers. More particularly, the capacitors 21, 27, 33 may be shunted to ground by means of individual diode-rectifiers. In this case, the anode element of a diode-rectifier is tied to the plate of each such capacitor closest the base electrode, and the cathode element is tied to ground. Additionally, the anode element of a fourth rectifier is tied to the common-anode junctures of diode-rectifiers 20, 26, 32, and the cathode element is grounded. It will be appreciated that for lower frequency application, a resistor element may be employed in place of each of the four diodes discussed immediately above in connection with high frequency operating characteristics.

In constructing the circuit of the invention, use of the values set forth below yielded excellent results. It should be understood, however, that the values given are to be construed as illustrative, rather than limitative, and that the invention is not limited solely to such values.

| Element: | Value or designation |
|---|---|
| Capacitors 19, 21, 27, 33 | 10–10,000 microfarads. |
| Resistors 11, 12, 13 | 4700 ohms. |
| Resistors 17, 25, 31 | 12,000 ohms. |
| Diodes 4A, 4B, 5A, 5B, 6A, 6B | 1N646 type. |
| Diodes D20, D26, D32 | 1N659 type. |
| Transistors 14, 22, 28 | 2N338 NPN type. |

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A transistorized count down circuit which employs a plurality of stabilized pulse amplifiers having access to a source of positive operating potential which comprises oppositely poled diode means connected in series circuit relationship to form separate common junctures between three pairs of anode elements and separate common junctures between three pairs of cathode elements; transistor means each provided with base electrodes, grounded emitter electrodes, and collector electrodes connected to draw current from said source of operating potential via one of the common junctures between said cathode elements; resistor means inter-connecting each of said base electrodes to one of said common junctures between said pairs of anode elements; means including a series-connected capacitor and diode circuit coupled between each of said base electrodes and a source of input signal energy; and a resistor connected to join the juncture between each such capacitor and diode circuit to the collector electrode of one of said transistors.

2. A transistorized count down circuit which employs a plurality of stabilized pulse amplifiers having access to a source of positive operating potential which comprises three pairs of diodes connected in series-circuit relationship to form a first set of three junctures between the anode elements of each such pair, and second set of three junctures between the cathode elements of adjacent pairs; a set of three transistors each provided with a grounded emitter electrode, a base electrode and a collector electrode tied to one of said second set of three junctures; resistor means conductively interposed between each of said base electrodes and said source of operating potential, one point on each of said resistor means connected to one juncture in said first set; means including a series-connected capacitor and diode-rectifier circuit conductively interconnected between each of said base electrodes and a source of input signal energy, and resistor means interconnecting the common juncture between each of said series-connected capacitor and diode-rectifier circuits to the collector electrode of one of said transistors.

3. A transistorized count down circuit which employs a plurality of stabilized pulse amplifiers having access to a source of positive operating potential which comprises a first circuit which includes at least three pairs of oppositely poled diode-rectifiers connected to form three common junctures between anode elements and three common junctures between cathode elements; three transistors provided each with grounded emitter electrodes, base electrodes, and collector electrodes tied to one of the common junctures between said cathode elements; three collector load resistors each connected at corresponding ends to said source of operating potential and at opposite ends to one of common junctures between said anode elements; means including a series-connected capacitor and diode-rectifier conductively interposed between each of said base electrodes and a source of input signal energy, and resistor means connected from the juncture between said last-mentioned rectifier and said capacitor to a collector electrode of one of said transistors.

4. A transistorized count down circuit which employs a plurality of stabilized pulse amplifiers having access to a source of positive operating potential which comprises a first circuit which includes at least three pairs of oppositely poled diode rectifiers connected to form a closed loop; at least three junction transistors provided each with a base electrode, a grounded emitter electrode, and a collector electrode tied to the common juncture between one of said pairs of diode rectifiers; a set of three collector load resistors each having corresponding ends connected to said source of operating potential, and opposite ends connected through diode rectifiers to the collector electrodes of two of said junction transistors; a series-connected diode-rectifier and capacitor conductively interposed between each of said base electrodes and a source of input signal energy; first resistor means interconnected between each of said base electrodes and one of said opposite ends of said collector load resistors, respectively; and second resistor means connected between one terminal of each of said last-mentioned rectifiers and a collector electrode of one of said transistors.

References Cited in the file of this patent

UNITED STATES PATENTS

| | | |
|---|---|---|
| 2,828,417 | Fleming et al. | Mar. 25, 1958 |
| 2,843,320 | Chisholm | July 15, 1958 |
| 2,864,962 | Jensen | Dec. 16, 1958 |
| 2,876,365 | Slusser | Mar. 3, 1959 |